(12) United States Patent
Cederblad et al.

(10) Patent No.: US 6,692,606 B1
(45) Date of Patent: Feb. 17, 2004

(54) EXTRUDED NETTING EXHIBITING STRETCH AND BONDING

(75) Inventors: Hans O. Cederblad, Minnetonka, MN (US); Mark W. Lorenson, Stillwater, MN (US)

(73) Assignee: Leucadia, INC, New York, NY (US)

( * ) Notice: Subject to any disclaimer, the term of this patent is extended or adjusted under 35 U.S.C. 154(b) by 0 days.

(21) Appl. No.: 09/629,638

(22) Filed: Jul. 28, 2000

Related U.S. Application Data (62) Division of application No. 08/686,187, filed on Aug. 1, 1996, now Pat. No. 6,204,207.

(51) Int. Cl.[7] .............................................. B29C 47/00
(52) U.S. Cl. .................... 156/244; 156/166; 156/176; 156/178; 428/221
(58) Field of Search ..................... 156/244, 244.11, 156/244.22, 244.25, 290, 297, 163, 176, 178; 428/221

(56) References Cited

U.S. PATENT DOCUMENTS

| 504,537 A | 9/1893 | Amata |
| 2,197,188 A | 4/1940 | Lilley ........................ 428/364 |
| 2,919,467 A | 1/1960 | Mercer |
| 3,051,987 A | 9/1962 | Mercer |
| 3,070,840 A | 1/1963 | Mercer |
| 3,252,181 A | 5/1966 | Hureau |
| 3,639,917 A | 2/1972 | Althouse |
| 3,723,218 A | 3/1973 | Gaffney ..................... 156/167 |
| 3,791,784 A | 2/1974 | Arechavaleta |
| 3,867,242 A | 2/1975 | Miller |
| 3,874,834 A | 4/1975 | Arechavaleta |
| 4,062,995 A | 12/1977 | Korpman |
| 4,107,371 A | 8/1978 | Dean |
| 4,241,123 A | 12/1980 | Shih |
| 4,296,163 A | 10/1981 | Emi et al. .................. 428/212 |

(List continued on next page.)

FOREIGN PATENT DOCUMENTS

| DE | 1 504 29 | 1/1973 |
| DE | 3622740 A1 | 1/1988 |
| DE | 41 38 577 A1 | 5/1993 |
| EP | 0 096 458 | 12/1983 |
| EP | 0 097 496 A2 | 1/1984 |
| EP | 0 301 599 | 1/1989 |
| FR | 2.160.270 | 6/1973 |
| GB | 2 156 273 A | 10/1985 |
| IT | 955134 | 9/1973 |
| JP | 50-95576 | 7/1975 |
| JP | 53-2676 | 1/1978 |
| JP | 4-509328 | 9/1985 |
| JP | 2-259151 | 10/1990 |
| WO | WO 93/16870 | 9/1993 |
| WO | WO 97/11839 | 4/1997 |

OTHER PUBLICATIONS

Abstract from Database WPI, Week 9306, Derwent Publications Ltd., London, GB; AN 93–048265, XP002047040 & JP 04 371 834 A (Nippon Petrochemicals Co Ltd), Dec. 24, 1992, See Abstract.

Primary Examiner—Cynthia H. Kelly
Assistant Examiner—J. M. Gray
(74) Attorney, Agent, or Firm—Vidas, Arrett & Steinkraus PA (57) ABSTRACT

Extruded net with at least some strands which melt away upon the application of heat while other strands maintain elastic, or other desirable, properties. This netting is advantageously combined with a fabric in which the low melting strands function as an adhesive, while the high melting strands maintain their designed properties in the final laminate product.

8 Claims, 2 Drawing Sheets

U.S. PATENT DOCUMENTS

| | | |
|---|---|---|
| 4,329,309 A | 5/1982 | Kelly |
| 4,333,782 A | 6/1982 | Pieniak ..................... 156/164 |
| 4,351,872 A | 9/1982 | Brosseau et al. |
| 4,381,326 A | 4/1983 | Kelly |
| 4,399,184 A | 8/1983 | Nalle, Jr. .................... 428/255 |
| 4,410,587 A | 10/1983 | Fair et al. |
| 4,460,633 A | 7/1984 | Kobayashi et al. |
| 4,469,738 A | 9/1984 | Himelreich, Jr. |
| 4,469,739 A | 9/1984 | Gretzinger et al. |
| 4,567,011 A | 1/1986 | Nalle, Jr. .................... 264/504 |
| 4,606,964 A | 8/1986 | Wideman ................. 428/152 |
| 4,636,419 A | 1/1987 | Madsen et al. |
| 4,656,075 A * | 4/1987 | Mudge ...................... 428/110 |
| 4,661,389 A * | 4/1987 | Mudge et al. .............. 428/110 |
| 4,673,015 A | 6/1987 | Andreasson |
| 4,692,380 A | 9/1987 | Reid .......................... 428/349 |
| 4,728,565 A | 3/1988 | Fontana |
| 4,732,723 A | 3/1988 | Madsen et al. ............. 264/147 |
| 4,734,311 A | 3/1988 | Sokolowski ................ 428/152 |
| 4,755,247 A * | 7/1988 | Mudge ...................... 156/244 |
| 4,775,579 A | 10/1988 | Hagy et al. ................. 428/284 |
| 4,980,227 A | 12/1990 | Sekiguchi et al. |
| 4,999,232 A | 3/1991 | LeVan |
| 5,232,777 A | 8/1993 | Sipinen et al. .............. 428/364 |
| 5,242,436 A | 9/1993 | Weil et al. |
| 5,246,433 A | 9/1993 | Hasse et al. |
| 5,334,446 A | 8/1994 | Quantrille et al. .......... 428/284 |
| 5,358,500 A | 10/1994 | Lavon et al. |
| 6,074,505 A | 6/2000 | Ouellette et al. ........... 156/148 |
| 6,093,663 A | 7/2000 | Ouellette et al. ............. 442/5 |

* cited by examiner

EXTRUDED NETTING EXHIBITING STRETCH AND BONDING

The present application is a Divisional of U.S. patent application Ser. No. 08/686,187, filed Aug. 1, 1996 now U.S. Pat. No. 6,204,207, which is incorporated herein by reference in its entirety.

BACKGROUND OF THE INVENTION

This invention relates to fiber formed netting of an improved type and to composites formed therefrom. Fiber formed netting is the type of netting formed by means of an extrusion die which forms the individual strands or fibers of the net by extruding them from the die. The joints between strands, which form the strands into the net configuration, may be formed within the die or immediately after the strands exit the die. A variety of configurations are known such as square, diamond, twill, etc.

Composites making use of various types of netting including fiber formed (herein also termed extruded net) netting are generally known. In such composites the netting is laminated to one or more fabric overlays. Chief among such uses and composites are absorbent fabrics for disposable diapers, incontinent briefs, training pants, bandages, dressings, diaper holders and liners and feminine hygiene garments, medical gowns, medical drapes, mattress pads, blankets, sheets, clothing and the like. Since such garments desirably include elastic portions, it has been the practice to include in such composite articles a net which exhibits unidirectional stretch. Such a net typically includes elastic strands extending in one direction and non-elastic strands in another direction.

One such net is described in U.S. Pat. No. 6,391,420 B1, entitled BICOMPONENT ELASTOMERIC NETTING. In such net the different strands may have different composition and/or properties.

Another type of net is the so called Thermanet as described in U.S. Pat. Nos. 4,755,247; 4,661,389 and 4,410,587 in which a heat activated adhesive coating is provided on one or more strands of the netting for bonding the netting in a composite structure. This "coating" is coextruded simultaneously with the core netting.

The entire content of all the foregoing are incorporated herein by reference.

SUMMARY OF THE INVENTION

In general, this invention provides netting having some strands which are adhesive and some strands which have an elastic or other designed property. The strands may extend in different or in the same directions.

More particularly, this invention in one embodiment relates to a bicomponent netting that, in one direction features strands made with a polymer resin suitable for melting and adhesion in lamination to another substrate. The strands in the other direction may have any desirable feature, such as rigidity, strength, distinctive color, distinctive geometry, elasticity, etc. The preferred configuration in this embodiment of the invention is elasticity in the strands extending in the non-adhesive direction, but many other combinations are possible. Thus, an extruded, bicomponent netting of preferred form provides elastomeric properties in strands in one direction and an adhesive polymer in strands in the other direction as is more fully described below.

Netting is a convenient form for making a composite material in which elastomeric strands provide stretch and recovery properties in one direction and in which adhesive strands in another direction provide the bonding to the other material(s) forming the composite. Because of the bonding nature of the adhesive strands and the elastomeric nature of the elastomeric strands, the composite product retains most, if not all, of the netting's elasticity, drape, breathability, moisture/fluid transfer capabilities, etc. It should be noted however, that the composite is elastic only if the component that the elastic netting is bonded to is elastic or deformable, or can be made so by post-treatment procedure.

One disadvantage with all previous netting products that do not feature a high degree of elasticity in one or both directions is that the non-elastic strands, when cut, have a stiff, sharp, somewhat abrasive, or "prickly" edge. In applications where the netting composite is used in contact with human skin, these "prickly" edges are irritating and unacceptable. The non-elastic strands are soft enough only when made from a material with a low enough modulus and low resin hardness. The low modulus required is typically only found in highly elastic, soft elastomer resins (resins similar to those used in elastic strands). However, one can not use the same or similar resins for the strands in both directions if one wants one set of strands to melt and bond to a fabric, as in the present invention, while the other set of strands remain virtually unaffected. The non-elastic strands must have a significantly lower melt temperature. Non-elastic strands also have other advantages beneficial to the making of the total product, such as improved web handling characteristics and non-blocking properties and generally lower raw material cost. Strands with such characteristics are described below.

Softening Point/Melting Point

For the adhesive strands to achieve a good mechanical bond to a fabric in lamination in order to form a composite structure, they must have certain minimum flow properties under pressure. The adhesive strands' viscosity must be reduced to the point where it, under pressure, is fluid enough to at least partially be able to penetrate the fabric to which it is being laminated. As the adhesive resin's viscosity is a function of its temperature, the minimum required flow properties can be characterized by temperature dependent material properties. For the current purpose, the adhesive resins' softening temperature and melt temperature are suitable material properties. Many materials are somewhat conformable under pressure at their softening temperature, possibly capable of a weak mechanical bond if laminated at this temperature. At the material's melt temperature, a much greater degree of molecular movement is possible, usually making the flow properties under pressure sufficient to form a mechanical bond to a fabric in lamination. The higher the temperature, the lower the adhesive resin's viscosity, and the better the flow properties. Typically, one needs to laminate at a temperature above the adhesive resin's melt temperature to achieve the desired bond to a fabric in lamination. In this application, the lamination temperature is generally somewhat higher than the adhesive resin's melt temperature. However, in some instances, lamination temperatures as low as the adhesive resin's softening temperature may be acceptably useful in forming a composite. Melt temperature is to be taken herein as referring to any acceptable temperature which functions to achieve bonding.

As already indicated, one major disadvantage of non-elastic strands is their "prickly" ends. By melting and bonding the non-elastic adhesive strands into a fabric substrate, according to this invention, the non-elastic strand is flattened out, imbedded in the substrate, and is no longer a continuous structure, as the strand is partially disintegrated. All this contributes to reducing the intrinsic nature of the strand's end to a point where it is no longer detectable by feel. However one can typically still visually see the remnants of the strand.

Also, the use of this type of netting in composites allows for more simple laminating operations and eliminates the need for additional adhesives. For example, this type of netting provides the opportunity to combine processes (extrusion with in-line lamination), and reduces the raw material cost by eliminating the need for powder or spray adhesives.

DETAILED DESCRIPTION OF THE PREFERRED EMBODIMENTS

In its most general aspect this invention provides extruded net (fiber formed) comprised of a network of crossing, extruded strands (usually, the crossing strands are normal to each other but may also take other forms, such as diamond or twill configurations), some of which may be of an extrudable plastic resin which, upon the application of heat, softens and melts out of the network for bonding in lamination. Thus, in one arrangement, the strands in one direction will have a melting point below that of the strands in the other direction. The melting point differential between the lower melting point strands and the higher melting point strands will vary depending on the particular thermoplastic resin compositions used for the two sets of strands. The term "fiber formed" refers to strand extruded netting. That is, netting in which the individual strands are extruded from a die, the strands being joined within the die or at the exit thereof.

Figure 1:
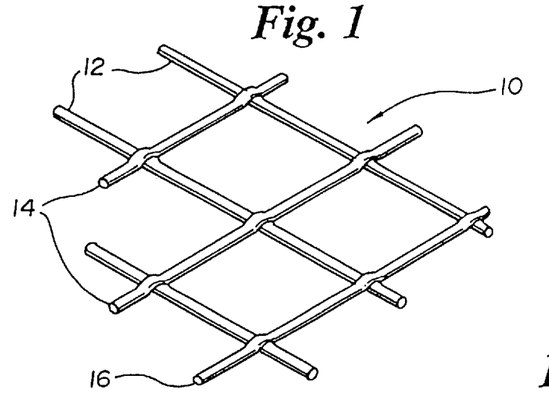
FIG. 1 is a fragmentary view of a small portion of netting according to one embodiment of the invention.

One such embodiment is shown in FIG. 1 which comprises an extruded net generally indicated at 10 of strands 12 extending in one direction and strands 14 and 16 extending in a transverse direction. In this net, strands 12 may be of an HMP (high melting point) elastic resin such as is normally used in extruded net whereas strands 14 are of a LMP (low melting point) net according to one form of the invention. This Figure exemplifies a net in which only one or a few of some strands 14 are of the LMP type while others 16 are not, although in preferred embodiments all of the transverse strands are of LMP.

Most nettings relating to this invention have "thermoplastic" resins in the non-adhesive strands. However, any thermoplastic resin, such as polypropylene or a styrenic block copolymer blend, can be made to function as an adhesive resin if the subsequent lamination temperature is above their melt temperatures and the other strands are not negatively affected.

The type of netting described in FIG. 1 may have significant conceptual importance. For example, two or more netting functions can be incorporated into the strands of one direction. By alternating adhesive LMP strands and elastic HMP strands in the same direction, two different functions (bonding and elasticity) can be incorporated from the same set of directional strands. A third function, e.g., stiffness can then be incorporated in the transverse direction (TD) strands.

As used herein, MD (machine direction) refers to strands which extend in the direction in which the machine processing extends and moves. TD (transverse direction) refers to strands which extend across the MD direction.

Assume the elastic strands are in the machine direction (MD) and the adhesive strands in the transverse direction (TD) as shown in FIG. 1. By alternating the elastic MD strands with polypropylene strands, and then orienting the MD polypropylene strands (while, at the same time the elastic MD strands are stretched), an elastic product with a "stop" is created. The "stop" relates to the maximum elongation that the elastic strands are allowed before the high-modulus polypropylene strands are pulled tight and prevent any further (low-modulus) stretching in the MD direction.

Figure 2:
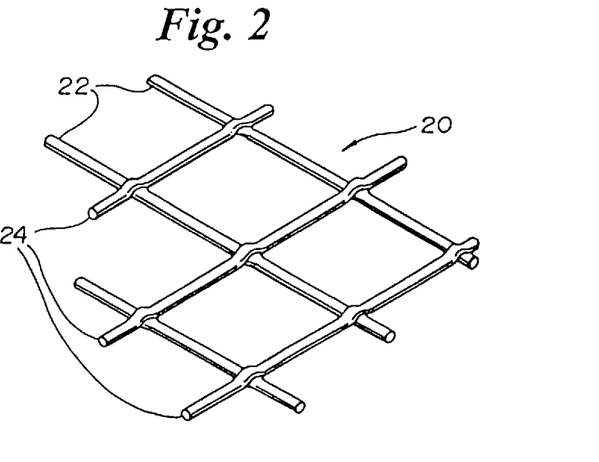
FIG. 2 is a fragmentary view of a small portion of netting according to a second embodiment of the invention.

On the other hand, an embodiment is shown in FIG. 2 in which the net generally indicated at 20 is comprised of LMP adhesive strands 22 in the MD direction and all of the transverse TD strands 24 are of the HMP elastic type, according to the invention.

Figure 3:
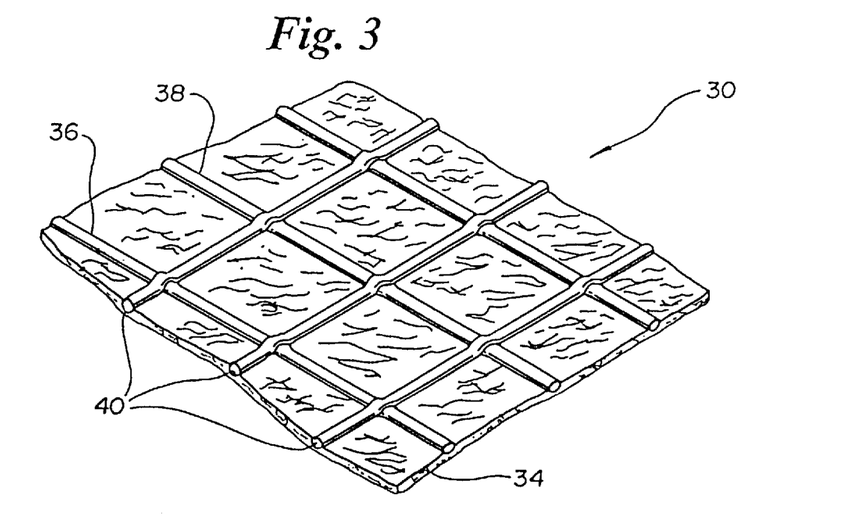
FIG. 3 is a pictorial view of a form of the netting of the invention in a composite article prior to lamination.

In all preferred embodiments, the meltable LMP strands will become tacky or adhesive-like upon application of heat and pressure and will function to bond the remaining strands to another fabric or the like to form a composite structure. Such a composite structure generally indicated at 30, prior to lamination, is shown in FIG. 3. It may include one covering layer as shown in the Figure at 34 or two, covering both sides of the netting (not shown). The covering layer may be of a wide variety of materials and configurations. For example, non-wovens, tissue, foil, foam, film, fabrics, scrims, and other fabrics, may be used. All such materials are referred to herein collectively as "fabric".

A variety of nonwovens can be used in this invention. The examples below are categorized based on the forming and/or bonding method used in their manufacture.

Spunbonded nonwovens, formed directly from molten plastic and typically calendar thermal-bonded.

Meltblown nonwovens, formed directly from molten plastic and often calendar thermal-bonded.

Wet-laid, air-laid, or dry-laid (carded) nonwovens. These nonwovens are made from pre-made staple fibers. They can be bonded with a variety of methods including spunlacing (hydroentangling), needle punching, stitching, powder bonding, solvent/latex bonding, calendar thermal bonding, and through-air thermal bonding.

The net generally indicated at 36 in FIG. 3 is preferably comprised, for example, of extruded plastic strands 38, i.e., of a higher melting point (HMP) in the transverse direction (TD) and low melting point (LMP) strands 40 in the machine direction (MD). Thus, upon application of heat and pressure during lamination, the LMP strands 40 melt away to some degree to achieve bonding, leaving a structure of HMP plastic strands 38 which may be useful in a variety of composite structures.

Figure 4:
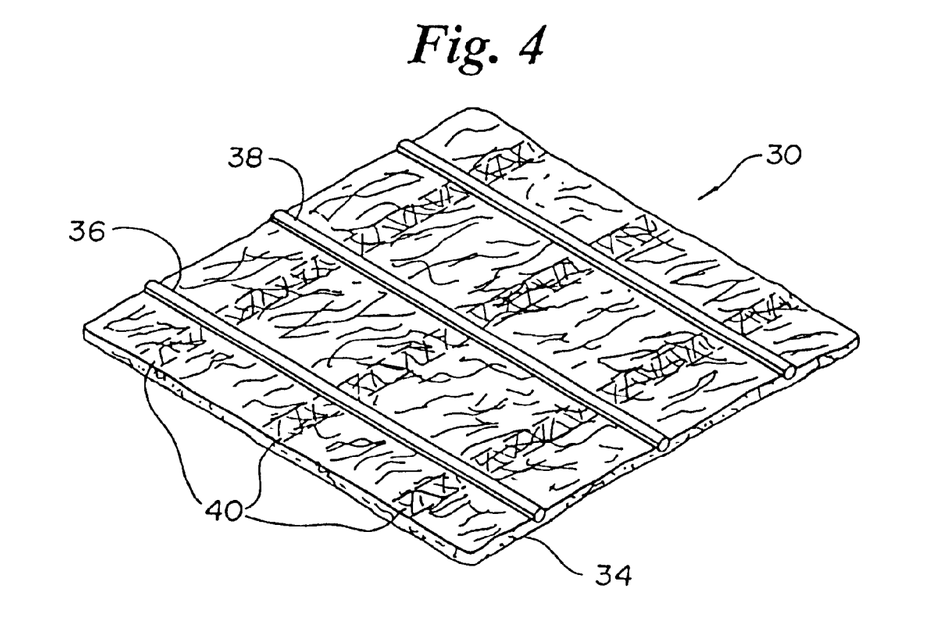
FIG. 4 is a view of the article of FIG. 3 following lamination.

The composite is shown in FIG. 4 after lamination. The composite bond strength is often further improved if the LMP strands 40 are made from a heat seal or tielayer resin with functionalized and/or polar groups. Also, for example, the HMP strands 38 may be parallel and upon melting of the LMP strands, the network no longer exists leaving substantially a series of parallel HMP strands remaining, as shown in FIG. 4.

Some remains of the adhesive strands usually exist after lamination as can be seen schematically in the cross-hatched areas of FIG. 4. The amount of adhesive strand disintegration is dependent on the amount of heat and pressure applied in the lamination process. Thus, the distinctive adhesive strands may be gone, but some remains of them may still be visible.

The adhesive strands may bond along their entire length. The bond thus may have more of a "linear" character than a "spot" character. In certain select cases however, the bond has more of a "spot" character. To describe these important relationships, one must recognize that bicomponent netting is made by extruding TD strands intermittently onto (and to some degree pushed into) MD strands. The netting is thus essentially a two-planar structure, with the MD strands positioned on one side or the other of the TD strands. The TD strands are typically bonded quite well to the MD strands.

Consider a laminated composite structure, such as a bicomponent netting laminated to a nonwoven fabric. Assume that the adhesive strands are in the machine direction. The netting may be positioned either with the TD strands next to the nonwoven, or with the MD strands next to the nonwoven. When the MD strands are next to the nonwoven, the laminated bond between the netting and nonwoven is linear, as an uninterrupted MD strand has been fused into the nonwoven. This creates a maximum bond of the MD strand to the nonwoven. However, the TD strands' bond to the nonwoven is only as strong as its bond to the MD strands.

Now consider the above situation, with the exception that now the TD strands are positioned next to the nonwoven. Such a structure is shown in FIG. 3 in which the TD strands are facing the nonwoven 34. The adhesive MD strands now have to be pressed down further in the lamination process to reach and bond to the nonwoven underneath. The linear MD strand bond is now intermittently interrupted by the TD strands. Depending on the TD strand spacing, the MD strand bond can either be characterized as "intermittently linear" or "spot" bonded. Due to the somewhat reduced bonding area to the nonwoven in this case, the nonwoven's bond to the MD strands is not quite as strong. However, in most cases the bond can still be made strong enough to yield the entire laminate non-delaminateable. In this case, the TD strand is enclosed by the MD strand. This gives the TD strand a much greater bond to the nonwoven, then if the strand orientation is reversed. This is because the tensile strength of the MD strand wrapping around the TD strand is typically greater than the bond strength between the MD and TD strands.

Thus, depending on the netting's strand orientation and the TD strand spacing, the bond can be characterized as either "linear", "intermittently linear", or "spot". The more "spot" bonded the fabric is the better its original drape and porosity properties are preserved, but the lower the laminate's maximum peel strength.

To achieve a purely mechanical bond, the LMP resin's melt temperature needs to be below that of the HMP resin, that is to obtain flow for penetration into the fabric. Under the heat and pressure of the lamination process, the LMP resin flows, penetrates, and encapsulates the fibers of the fabric. A stronger bond can be achieved if the mechanical bond is also accompanied by a chemical bond. The strength of the chemical bond is dependent on the compatibility and molecular bonding forces of the netting's adhesive resin and the fabric. The composite bond strength is often further improved if the LMP strands are made from a heat seal or tielayer resin with functionalized and/or polar groups.

Selecting a fabric compatible with the adhesive strands is important, but is often not an option due to a desire to use a very specific fabric. Thus, one has a better chance at providing an appropriate netting product by selecting an adhesive resin that is optimal for a particular fabric. For example, consider these two resin classes:

mVLDPE's (metallocene Very Low Density Poly Ethylenes):

These resins have no or low polarity, and the bond can therefore be expected to be primarily mechanical in nature. However, their melt temperatures are very low, allowing them to be easily melted and their viscosity lowered to allow for excellent penetration into a bonding substrate. The melt temperature of the resin is a function of the resin density as is demonstrated by Table I.

TABLE I

| Resin density (g/cm$^3$) | Resin grade | Melt temperature (F) |
|---|---|---|
| 0.873 | EXACT 4049 | 143 |
| 0.878 | EXACT 4041 | 152 |
| 0.880 | EXACT 4033 | 155 |
| 0.887 | EXACT 4011 | 167 |

EVA resins (Ethylene Vinyl Acetate):

These resins are polar in nature, and can be expected to chemically bond well to other polar substrates. The higher the vinyl acetate (VA) content, the greater the polarity and the lower the melt temperature (See Table II). The melt temperature is generally higher than for the mVLDPE resins above.

TABLE II

| % VA in the EVA resin | Melt temperature (F) |
|---|---|
| 0 | 228 |
| 10 | 207 |
| 13.3 | 198 |
| 15.3 | 194 |
| 18 | 187 |
| 19.3 | 185 |
| 22 | 178 |
| 24.5 | 171 |
| 28 | 162 |

Figure 5:
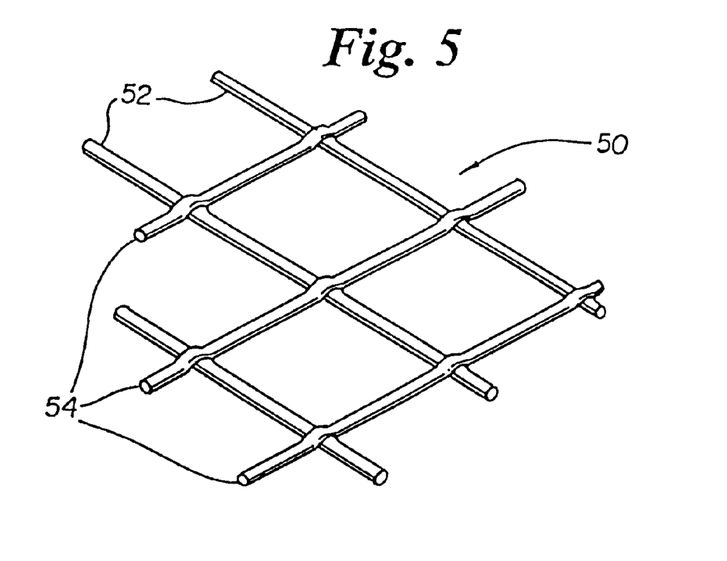
FIG. 5 is a fragmentary view of a small portion of netting according to a third embodiment of the invention.

Another form of the invention provides extruded netting generally indicated at 50, as shown in FIG. 5 which exhibits unidirectional elasticity or stretch and spot bonding in composite structures. Such a netting for example may comprise extruded elastomeric strands 52 of HMP extending in one direction, e.g., CD and extruded strands 54 of LMP extending in the other direction, e.g., MD.

When used to form a composite with a fabric or the like, such as that shown in FIGS. 3 and 4, by laminating the composite upon running the assembled elements through a heated calendar roll, the LMP strands become an adhesive between the elastomeric HMP strands and the fabric to provide a laminated composite such as is shown in FIG. 4. After lamination the LMP strands are usually no longer intact, rather they have disintegrated to at least some degree. Depending on the amount of heat and pressure applied, the degree of strand disintegration varies. Thus, the LMP strand could still have some integrity and be lightly bonded, or could be almost totally disintegrated and firmly bonded. The traditional lamination process uses heated calendar rolls to apply the necessary heat and pressure to produce a laminate. Some alternative ways that improve the overall lamination efficiency may also be used.

In the traditional lamination process, the adhesive strands are preheated by transferring heat through the fabric to the netting. This heat transfer is slow and inefficient, as the fabric usually acts as an insulator for the netting. The fabric and the netting's non-adhesive strands must not be negatively affected by the applied preheat temperature. These constraints usually result in a defined operating window for lamination, defined on the lower end by the melt temperature of the adhesive resin, and on the high end by the highest temperature where the non-adhesive strands and/or the fabric remains acceptably unaffected.

For a laminated structure (net+fabric) made with the traditional lamination process, the components can only be heated from the fabric side. Any preheat rolls facing the netting side must be at a temperature lower than the melt temperature of the netting's adhesive strands. The insulating effect of the fabric plus the inability to preheat from the netting side of the laminate make preheating on hot cans an inefficient but acceptable method for lamination.

For a trilaminate structure (fabric+net+fabric), all preheat rolls in a traditional lamination process can be used to heat the netting indirectly from both sides. However, both fabrics act as insulators, making the hot can method inefficient also for the trilaminate structure, but acceptable.

Alternative and potentially more effective heating methods for laminating the netting include hot air, the use of RF and microwave heating, radiant-gas and radiant-electric arrangements as well. Other indirect heating methods may also be feasible.

All extrudable elastomeric resins and blends thereof may be used as LMP adhesive strands. Actually, all of the HMP resins discussed herein can be used as an LMP strand if used in conjunction with other strands of higher melting point. There are generally considered to be six classes of commercially available thermoplastic HMP elastomers (TPE's).

Styrenic Block Copolymers (SBC's)

The various SBC's include:

Styrene-Butadiene-Styrene (SBS)

Styrene-Isoprene-Styrene (SIS)

Styrene-Ethylene/Butylene-Styrene (SEBS)

Styrene-Ethylene/Propylene-Styrene (SEPS) (uncommon)

Tradenames and producers include VECTOR, a registered trademark for thermoplastic elastomers (SBS and SIS) by Dexco Polymers, KRATON, a registered trademark for styrene-butadiene elastomers (SBS, SIS and SEBS) by Shell Chemical Co., FINAPRENE, a registered trademark for elastomers (SBS) by Fina Oil & Chemical, and EUROPRENE, a registered trademark for synthetic rubber (SBS and SIS) by EniChem Elastomers. Only Shell makes the SEBS resin (Kraton G).

Thermoplastic Olefin Blends (TPO's)

Tradenames, trademarks and suppliers of traditional TPO's include POLYTROPE (a tradename for a blend of polypropylene and EPDM, a rubber) by A. Schulman and TELCAR, a registered trademark for thermoplastic elastomers (also a blend of polypropylene and EPDM) by Teknor Apex. These are propylene/EPDM block copolymers. EPDM is Ethylene Propylene Diene Monomer.

A new subclass of TPO's are the VLDPE's (very low density), copolymers with a density of .ltoreq.0.880 g/cm.sup.3. The elasticity of polyethylenes increases with decreasing density. Tradenames and suppliers of these include EXACT, a registered trademark for polymers by Exxon Chemical Co., ENGAGE, a registered trademark for plastic resins and AFFINITY, a registered trademark for plastic resins by Dow Plastics.

Elastomeric Alloys

This class of TPE's consists of mixtures using two or more polymers that have received proprietary treatment to give them properties significantly superior to the simple blends of the same constituents. The two basic types are: Thermoplastic vulcanites (TPV's), such as SANTOPRENE, a registered trademark for thermoplastic elastomers (polypropylene and crosslinked EPDM) by Monsanto and GEOLAST, a registered trademark for thermoplastic elastomers (polypropylene or nitride rubber) by Advanced Elastomer Systems and melt-processible rubbers (MPR's), such as ALCRYN, a registered trademark for synthetic rubbers (polyvinyldiene chloride and crosslinked polyvinylacetate copolymer) by Du Pont Co.

Thermoplastic Polyurethanes (TPU's)

Tradenames and suppliers include PELLETHANE, a registered trademark for urethane elastomers (polyurethane with polyester, polyether, or polycaprolactone copolymers) by Dow Chemical and ESTANE, a registered trademark for resins by B.F. Goodrich.

Thermoplastic Copolyesters

Tradenames and producers include HYTREL, a registered trademark for polyester elastomers (polyether-ester copolymer) by Du Pont Co., and ARNITEL, a registered trademark for plastics (polyether-ester copolymer) by DSM Engineering Plastics.

Thermoplastic Polyamides

PEBAX, a registered trademark for plastic material (a block copolymer polyamide and polyether) made by Elf Atochem.

Any extrudable plastic resin can be used for the LMP strands, as long as its softening/melting point is lower than the HMP material used in any instance. However, resins that feature a low melting point (facilitates mechanical bonding), and/or a high level of (various) functional groups (facilitates chemical bonding) are preferred. A low melting point improves the polymer's fluidity at low temperatures. Examples are found in Table III.

TABLE III

Examples of LMP resin types (not an exhaustive list)

| Resin Type | Supplier | Resin Tradename |
|---|---|---|
| mVLDPE (metallocene Very Low Density Polyethylene) | Exxon Chemical Corp. Dow Chemical Corp. | Exact[1] Engage, Affinity[2] |
| EVA (Ethylene Vinyl Acetate) copolymer | Exxon Chemical Corp. Quantum Chemical Corp. | Escorene[1] Ultrathene[3] |
| EMA (Ethylene Methyl Acrylate) copolymer | Exxon Chemical Corp. Quantum Chemical Corp. | Optema[1] Acrythene[3] |
| EAA (Ethylene Acrylic Acid) copolymer | Dow Chemical Corp. | Primacor[2] |
| PVC (Poly Vinyl Chloride) | Colorite Plastics Company | Unichem[4] |
| PA (polyamide) | Allied Signal, Inc. | Capron[5] |
| Ionomers | DuPont Company | Surlyn[6] |

[1]Registered trademark for polymeric materials.
[2]Registered trademark for plastic resins.
[3]Registered trademark for copolymer materials.
[4]Registered trademark for plastic compounds.
[5]Registered trademark for resins.
[6]Registered trademark for polymeric compounds.

Other feasible LMP resins include copolyamides, copolyesters, anhydride modified polyethylenes, and various styrenic block copolymers.

As already pointed out, LMP resins responsive to heating by other means such as RF or microwave heating may be used. Polyvinyl chloride (PVC) and polyvinyldiene chloride (PVDC) are examples. Additives may be combined with other LMP resins to make them more susceptible to such heating.

The netting described herein will preferably include orientation and/or stretch modification of either or both sets of strands to modify elastomeric properties, strength, bonding properties, strand count, strand size, joints, etc. See Examples 9, 10 and 11 herein below. Stretch modification is a process where the elastic netting is stretched, and then allowed to relax, in one or both strand directions. The process can be performed at various stretch rates and stretch ratios, as well as at ambient or elevated temperature. In effect, the resulting product has already gone through its first hysteresis cycle. Orientation is well known in the art.

EXAMPLES

Example #1

An extruded netting with an MD strand count of 12 per inch, and a TD strand count of 7 per inch weighing 22 PMSF (pounds per 1,000 square feet) is used. The netting's MD strands are made from EXACT* 4041 resin (a mVLDPE resin made by Exxon Chemical), which has a melt temperature of 152 F. The netting TD strands are made from a blend containing 85% VECTOR* 7400D (a styrene-butadiene-styrene block copolymer resin with a styrene:butadiene ratio of 31:69, and containing 33% oil from Dexco Polymers) and 15% STYRON* 678C (a general purpose polystyrene resin from Dow Plastics). The elastomer blend is affected by its polystyrene glass transition temperature of 200 F. The netting is laminated to a 1.0 oz/yd$^2$ spunbonded polyolefin nonwoven fabric. The components are laminated at 180 F, with a nip pressure of 180 pli at a line speed of 11 fpm following 13 seconds of hot roll preheat time. The netting is positioned with the elastic TD strands next to the nonwoven. The resulting bilaminate has non-delaminateable MD strands (or what remains of the MD strands), and elastic TD strands that are almost non-delaminateable.
* Previously identified as trademarks.

Example #2

An extruded netting with an MD strandcount of 12 per inch, and a TD strandcount of 7 per inch weighing 22 PMSF (pounds per 1,000 square feet) is used. The netting's MD strands are made from EXACT* 4041 resin (an mVLDPE resin made by Exxon Chemical), which has a melt temperature of 152 F. The netting TD strands are made from a blend containing 85% VECTOR* 7400D (a styrene-butadiene-styrene block copolymer resin with a styrene:butadiene ratio of 31:69, and containing 33% oil from Dexco Polymers) and 15% STYRON* 678C (a general purpose polystyrene resin from Dow Plastics). The elastomer blend is affected by its polystyrene glass transition temperature of 200 F. The netting is laminated to a 1.0 oz/yd$^2$ spunbonded polyolefin nonwoven fabric. The components are laminated at 180 F, with a nip pressure of 180 pli at a line speed of 11 fpm following 13 seconds of hot roll preheat time. The netting is positioned with the MD strands next to the nonwoven. The resulting bilaminate has non-delaminateable MD strands (or what remains of the MD strands), and elastic TD strands that have a moderately strong bond to the laminate.
* Previously identified as trademarks.

Example #3

An extruded netting with an MD strandcount of 12 per inch, and a TD strandcount of 7 per inch weighing 22 PMSF (pounds per 1,000 square feet) is used. The netting's MD strands are made from ESCORENE* LD 720.62 resin (an EVA resin from Exxon Chemical containing 19.3% VA), which has a melt temperature of 185 F. The netting TD strands are made from a blend containing 85% VECTOR* 7400D (a styrene-butadiene-styrene block copolymer resin with a styrene:butadiene ratio of 31:69, and containing 33% oil from Dexco Polymers) and 15% STYRON* 678C (a general purpose polystyrene resin from Dow Plastics). The elastomer blend is affected by its polystyrene glass transition temperature of 200 F. The netting is laminated to a 1.0 oz/yd$^2$ spunbonded polyolefin nonwoven. The components are laminated at 210 F, with a nip pressure of 180 pli at a line speed of 11 fpm following 13 seconds of hot roll preheat time. The netting is positioned with the elastic TD strands next to the nonwoven. The resulting bilaminate has non-delaminateable MD strands (or what remains of the MD strands), and elastic TD strands that are almost non-delaminateable.
* Previously identified as trademarks.

Example #4

A bicomponent extruded netting with an MD strandcount of 12 per inch, and a TD strandcount of 7 per inch weighing 22 PMSF (pounds per 1,000 square feet) is used. The netting MD strands are made from EXACT* 4041 resin (an mVLDPE resin made by Exxon Chemical), which has a melt temperature of 152 F. The netting TD strands are made from a blend containing 85% VECTOR* 7400D (a styrene-butadiene-styrene block copolymer resin with a styrene:butadiene ratio of 31:69, and containing 33% oil from Dexco Polymers) and 15% STYRON* 678C (a general purpose polystyrene resin from Dow Plastics). The elastomer blend is affected by its polystyrene glass transition temperature of 200 F. The netting is laminated between two layers of 1.0 oz/yd$^2$ spunbonded polyolefin nonwoven fabric. The components are laminated at 190 F, with a nip pressure of 160 pli at a line speed of 22 fpm following 32 seconds of hot roll preheat time. The resulting trilaminate has non-delaminateable MD strands to the nonwoven layer they face, and is almost non-delaminateable to the nonwoven that faces the TD strands. The elastic TD strands are strongly bonded.
* Previously identified as trademarks.

Example #5

An extruded netting with an MD strandcount of 12 per inch, and a TD strand count of 7 per inch weighing 22 PMSF (pounds per 1,000 square feet) is used. The netting MD strands are made from EXACT* 4041 resin (an mVLDPE resin made by Exxon Chemical), which has a melt temperature of 152 F. The netting TD strands are made from a blend containing 85% VECTOR* 7400D (a styrene-butadiene-styrene block copolymer resin with a styrene:butadiene ratio of 31:69, and containing 33% oil from Dexco Polymers) and 15% STYRON* 678C (a general purpose polystyrene resin from Dow Plastics). The elastomer blend is affected by its polystyrene glass transition temperature of 200 F. The netting is laminated to 0.92 oz/yd$^2$ spunbonded polyolefin nonwoven fabric. The components are laminated at 205 F, with a nip pressure of 140 pli at a line speed of 10 fpm following 43 seconds of total intermittent hot roll preheat time. The netting is positioned with the elastic TD strands next to the nonwoven fabric. The resulting bilaminate is non-delaminateable.
* Previously identified as trademarks.

Example #6

An extruded netting with an MD strandcount of 12 per inch, and a TD strand count of 7 per inch weighing 22 PMSF (pounds per 1,000 square feet) is used. The netting MD strands are made from EXACT* 4041 resin (an mVLDPE resin made by Exxon Chemical), which has a melt temperature of 152 F. The netting's TD strands are made from a blend containing 85% VECTOR* 7400D (a styrene-butadiene-styrene block copolymer resin with a styrene:butadiene ratio of 31:69, and containing 33% oil from Dexco Polymers) and 15% STYRON* 678C (a general purpose polystyrene resin from Dow Plastics). The elastomer blend is affected by its polystyrene glass transition temperature of 200 F. The netting is laminated to 0.92 oz/yd$^2$ spunbonded polyolefin nonwoven fabric. The components are laminated at 205 F, with a nip pressure of 140 pli at a line speed of 50 fpm following 8.5 seconds of total intermittent hot roll preheat time. The netting is positioned with the elastic TD strands next to the nonwoven. The resulting bilaminate is very well bonded.

* Previously identified as trademarks.

Example #7

An extruded netting with an MD strandcount of 12 per inch, and a TD strand count of 7 per inch weighing 22 PMSF (pounds per 1,000 square feet) is used. The netting MD strands are made from EXACT* 4041 resin (an mVLDPE resin made by Exxon Chemical), which has a melt temperature of 152 F. The netting's TD strands are made from a blend containing 85% VECTOR* 7400D (a styrene-butadiene-styrene block copolymer resin with a styrene:butadiene ratio of 31:69, and containing 33% oil from Dexco Polymers) and 15% STYRON* 678C (a general purpose polystyrene resin from Dow Plastics). The elastomer blend is affected by its polystyrene glass transition temperature of 200 F. The netting is laminated to 0.97 oz/yd$^2$ spunbonded polyolefin nonwoven fabric. The components are laminated at 205 F, with a nip pressure of 140 pli at a line speed of 15 fpm following 28 seconds of total intermittent hot roll preheat time. The netting is positioned with the elastic TD strands next to the nonwoven. The resulting bilaminate is non-delaminateable.

* Previously identified as trademarks.

Example #8

An extruded netting with an MD strandcount of 12 per inch, and a TD strand count of 7 per inch weighing 22 PMSF (pounds per 1,000 square feet) is used. The netting MD strands are made from EXACT* 4041 resin (an mVLDPE resin made by Exxon Chemical), which has a melt temperature of 152 F. The netting' TD strands are made from a blend containing 85% VECTOR* 7400D (a styrene-butadiene-styrene block copolymer resin with a styrene:butadiene ratio of 31:69, and containing 33% oil from Dexco Polymers) and 15% STYRON* 678C (a general purpose polystyrene resin from Dow Plastics). The elastomer blend is affected by its polystyrene glass transition temperature of 200 F. The netting is laminated to 0.97 oz/yd$^2$ spunbonded polyolefin nonwoven fabric. The components are laminated at 255 F, with a nip pressure of 140 pli at a line speed of 10 fpm following 43 seconds of total intermittent hot roll preheat time. The netting is positioned with the elastic TD strands next to the nonwoven. The resulting bilaminate is non-delaminateable.

* Previously identified as trademarks.

Example #9

The 12×7 netting of Example #1 (above) can be stretched in the machine direction prior to lamination (stretch modification). The MD stretching best takes place in the 70–150 F temperature range. An effective MD stretch ratio (draft ratio) of 2.0 will have the following product implications:

The strandcount will change to 12×3.5.

The MD strand mass per unit length will be reduced by 50%, and the product's weight will be reduced to 11 PMSF.

A thinner MD strand, which, in turn, may be less "prickly".

A lower mass (and more economical) adhesive layer when used to bond to a fabric. The netting can then be laminated as in Example #1.

Example #10

An extruded netting with an adhesive (LMP) resin in the MD strands, and a high melting point (HMP) elastomeric resin in the TD strands. The LMP resin is EXACT* 4041 (melt temp. 152 F), and the HMP resin is HYTREL* 3078 (melt temp. 338 F). This product can be stretched (stretch modification) in the transverse direction at a temperature below the LMP resin's melting point (practically the 70–150 F temperature range). An effective TD stretch ratio (tenter ratio) is 2.0. This product is subsequently laminated to a fabric with a 180–200 F lamination temperature. The adhesive MD strands will bond to the fabric, and the frozen-in stresses of the elastic TD will be released, as the temperature is higher than the previous stretch modification temperature. The elastic TD strands will shrink, resulting in a puckered (corrugated or creped) elastic (in the TD) composite.

* Previously identified as trademarks.

Example #11

Same as Example #10, but part of the netting's MD strands are made from the HMP elastomeric resin (HYTREL* 3078), and part from the LMP adhesive resin (EXACT* 4041). The netting is biaxially stretched (stretch modification) prior to lamination. The laminated composite will be bonded by the adhesive MD strands, and puckered through shrinkage by the elastic TD and MD strands. The result is a biaxially elastic composite. The composite will be more puckered than creped or corrugated.

* Previously identified as trademarks.

Prior art nets have been used in disposable hygiene applications in which stretch netting is bonded to a nonwoven, tissue or other type of fabric to form a composite structure. In such applications the preferred netting has been a type which exhibits stretch in the TD direction only. In the final composite the MD strands actually have no function. However, in forming such netting by extrusion and in the formation of the composite structure, the MD strands are needed to carry the netting through the process, and to control the spacing and location of the strands.

As already pointed out, one problem with "prior art elastic nets" for disposable hygiene applications is the "prickly" ends of the MD strands. As long as the MD strands are not either very soft and/or very thin, they have proven to be too prickly. To date, only highly elastic (and soft) strands have been acceptable from a prickliness standpoint. A certain amount of strength and rigidity is required from the netting's MD strands to carry the web through both the extrusion and lamination process—something highly elastic MD strands can not do. The other main function of the MD strands in the laminate is to ensure that the elastic TD strands are uniformly spaced. However, once the netting is bonded in the composite, the MD strands usually have no function. This invention virtually eliminates the MD strands by substantially melting them into the fabric. Its role in the netting has been transformed from one of a carrier of elastic TD strands to one as the composite's adhesive.

This invention provides overall improved process efficiency as the adhesive normally used to bond the fabric is already supplied (the MD strands) in the netting. Thus, the normally applied spray adhesive and the additional associated process step, can be eliminated. The previously mentioned combination of carrier and adhesive functions of the MD strands also contribute to an efficient process. In the case of a tri-laminate (fabric-netting-fabric), two layers of spray adhesive and two process steps can be eliminated.

The basic most preferred embodiments are:

A. A bicomponent stretch netting in which the MD strands are comprised of a resin having a lower melting point (LMP) than that of the TD resin strands having a higher melting point (HMP). The reverse arrangement may also be used, i.e., in which the MD strands are the HMP strands and the TD strands are the LMP strands.

B. After formation of the bicomponent netting, the netting may be run through a heated calendar together with at least one fabric layer, the calendar temperature of which is at or above that of the LMP resin. The result is a laminated product in which the LMP strands are calendared flat and embedded into the fabric while the HMP strands essentially maintain their original shape and properties.

In a further extension of this preparation process, the netting may be calendared, together with an additional web or webs, e.g., a nonwoven or tissue or the like, where the web(s) become(s) bonded to the MD strands of the netting.

Example #12

An extruded netting with an MD strand count of 12 per inch and a TD strandcount of 7 per inch weighing 33 PMSF (pounds per 1,000 square feet) is used. The Netting's MD strands are made from a 50/50 blend of EXACT* 4041 (a mVLDPE resin made by Exxon Chemical) and ESCORENE* LD720.62 (an EVA copolymer resin containing 19.3% VA made by Exxon Chemical). The MD strands melt temperature is approximately 169 F. The netting TD strands are made from a blend containing 75% VECTOR* 7400D (a styrene-butadiene-styrene block copolymer resin with a styrene:butadiene ratio of 31:69, and containing 33% oil, from Dexco Polymers) and 25% STYRON* 678C (a general purpose polystyrene resin from Dow Plastics). The elastomer blend is affected by its polystyrene glass transition temperature of 200 F. The netting is laminated to a 1.0 oz/yd$^2$ nonwoven fabric. The components are laminated at 280 F, with a nip pressure of 20 pli at a line speed of 10 fpm following 14 seconds of hot roll preheat time. The netting is positioned with the MD strands next to the nonwoven. The resulting bilaminate has nondelaminatable MD strands (or what remains of the MD strands), and the elastic TD strands have been flattened.

* Previously identified as trademarks.

When subjecting LMP netting strands to temperatures above or around their melting point, the strands typically become sticky. This can be a problem when running over metal rollers or the like. However, when laminating to form a composite structure with nonwovens, tissue and the like, this is an asset. LMP resins such as EXACT* 4049 laminate very well to such substrates. Another issue arises in bringing the MD strands to or above their melting points. There is a dramatic reduction in MD strength. The strength becomes so low that it cannot carry the net through the process. However, when laminating the net to a tissue, nonwoven or the like, this function is transferred to the tissue/nonwoven substrate while the MD strands take on the newer function as the bonding media for the composite.

There are many positive interactions and synergies with the netting of the invention. If laminated to a tissue or nonwoven, any roll blocking concerns are eliminated as the tissue/nonwoven works as a "release layer". This provides more flexibility in resin and resin blend selection as a higher performing (stickier) elastomeric resin can be used.

The net of the invention can be converted to a net without LMP strands in the composite structure as the LMP strand melts into the fabric, losing its structural integrity. Yet the HMP strands are firmly locked into place in the original strand-spacing configuration.

Many variations of this basic idea may be made. For example, the MD and the TD strand materials can be reversed, which in a composite would yield a netting without TD strands.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is as follows:

1. A method of fabricating a composite fabric including extruded net, comprising:

forming a fiber formed extruded net of relatively HMP strands and relatively LMP strands by die extrusion in which the strands overlie each other to form junctions;

combining the net with an overlay of a fabric to be laminated to the net with a predetermined selection of one set of strands positioned immediately adjacent to the fabric, and laminating the net and fabric.

2. The method of claim 1 wherein the one set of strands positioned against the fabric is the LMP set of strands.

3. The method of claim 2 wherein the LMP strands extend in the MD direction.

4. The method of claim 1 wherein the one set of strands positioned against the fabric is the HMP set.

5. The method of claim 4 wherein the LMP strands extend in the MD direction.

6. The method of claim 1, wherein the net is bonded to the fabric by melting the LMP strands into the fabric making the strands relatively inelastic, while relatively maintaining the HMP in tact.

7. The method of claim 1, wherein the HMP strands and the LMP strands are only in contact with one another at intersecting points.

8. The method of claim 1, wherein the HMP strands and the LMP strands are homogeneous.

* * * * *